(12) United States Patent
Wijeratne

(10) Patent No.: US 7,302,468 B2
(45) Date of Patent: Nov. 27, 2007

(54) LOCAL AREA PREFERENCE DETERMINATION SYSTEM AND METHOD

(75) Inventor: Viranga L Wijeratne, Lawrenceville, GA (US)

(73) Assignee: Motorola Inc., Schaumburg, IL (US)

( * ) Notice: Subject to any disclaimer, the term of this patent is extended or adjusted under 35 U.S.C. 154(b) by 404 days.

(21) Appl. No.: 10/980,111

(22) Filed: Nov. 1, 2004

(65) Prior Publication Data

US 2006/0095516 A1   May 4, 2006

(51) Int. Cl.
*G06F 15/16* (2006.01)

(52) U.S. Cl. .................. 709/205; 709/206; 709/207; 446/297; 455/3.01; 455/3.05; 455/3.06

(58) Field of Classification Search ............... 709/205, 709/206; 446/297; 455/3.01
See application file for complete search history.

(56) References Cited

U.S. PATENT DOCUMENTS

| | | | |
|---|---|---|---|
| 4,173,016 A | 10/1979 | Dickson | |
| 5,086,394 A | 2/1992 | Shapira | |
| 5,587,823 A | 12/1996 | Yoshino et al. | |
| 6,088,435 A | 7/2000 | Barber et al. | |
| 6,331,972 B1 | 12/2001 | Harris et al. | |
| 6,438,576 B1 * | 8/2002 | Huang et al. | 709/202 |
| 6,487,180 B1 | 11/2002 | Borgstahl et al. | |
| 6,549,768 B1 | 4/2003 | Fraccaroli | |
| 6,735,430 B1 | 5/2004 | Farley et al. | |
| 6,746,246 B2 * | 6/2004 | Cliff | 434/219 |
| 6,757,517 B2 * | 6/2004 | Chang | 455/3.05 |
| 7,003,530 B2 * | 2/2006 | Johnson | 707/200 |
| 7,075,000 B2 * | 7/2006 | Gang et al. | 84/600 |
| 2002/0040326 A1 * | 4/2002 | Spratt | 705/26 |
| 2002/0147628 A1 * | 10/2002 | Specter et al. | 705/10 |
| 2003/0093790 A1 * | 5/2003 | Logan et al. | 725/38 |
| 2003/0236843 A1 * | 12/2003 | Weber et al. | 709/206 |
| 2004/0088249 A1 * | 5/2004 | Bartter et al. | 705/39 |
| 2005/0080673 A1 * | 4/2005 | Picker et al. | 705/14 |
| 2005/0170744 A1 * | 8/2005 | Smith et al. | 446/297 |
| 2005/0197961 A1 * | 9/2005 | Miller et al. | 705/52 |
| 2006/0008256 A1 * | 1/2006 | Khedouri et al. | 386/124 |
| 2006/0028398 A1 * | 2/2006 | Willmore | 345/2.3 |
| 2006/0032363 A1 * | 2/2006 | Platt | 84/601 |
| 2006/0069724 A1 * | 3/2006 | Langdon | 709/203 |

\* cited by examiner

*Primary Examiner*—Michael Lebentritt
*Assistant Examiner*—Abdulfattah Mustapha
(74) *Attorney, Agent, or Firm*—Hisashi D. Watanabe

(57) ABSTRACT

A preference determination system allows a music provider, like a band or disc jockey, to determine the musical preferences of the members at a gathering. As many members of a gathering use electronic devices, like cellular telephones, that include music and video players, these devices include a corresponding play list that includes information about the music or video. When at a gathering the music provider, for example, interrogates the devices of the members of the group and uploads their respective play lists. The music provider then compiles information about the music into a data compilation. The information may include artist, song title, release date, genre, etc. The music provider then sorts the data compilation to select information that is popular to a significant number of members in the group. The music provider then selects and plays music to the group consistent with the selected information. For example, if 50 people are at a gathering, and 30 have digital music by the Tom Waits on their devices, the music provider may decide to play "Innocent When You Dream" for the group.

11 Claims, 3 Drawing Sheets

LOCAL AREA PREFERENCE DETERMINATION SYSTEM AND METHOD

BACKGROUND

1. Technical Field

This invention relates generally to local area data acquisition systems, and more specifically to a local area system and method for determining the personal preferences of members in a local group.

2. Background Art

All too often people find themselves in places like sporting events, malls, parties and concerts where the music does not suit their tastes. For example, while some are died in the wool fans of the Muzak emitted from shopping mall loudspeakers, other people would rather hear the latest Britney Spears single while shopping. Similarly, while some may be impressed at sporting events by colored smoke spewing about to the strains of "Rock You Like a Hurricane", others keep randomly screaming "Freebird" in hopes that the DJ or maestro will instead spin that classic slice of Americana.

The problem in these group settings is that the DJ, band, minstrel or other music provider is unable to read the minds of the members of the group to determine their particular musical preferences. While some members of the group might be bold enough to shout, "Turn that garbage off! We want 'Ice Ice Baby'," the opinion of one vocal Vanilla Ice supporter doth not the collective opinion of the group make.

There is thus a need for a system to determine the musical preferences of a group of people in a local setting.

DETAILED DESCRIPTION OF THE INVENTION

Figure 1:
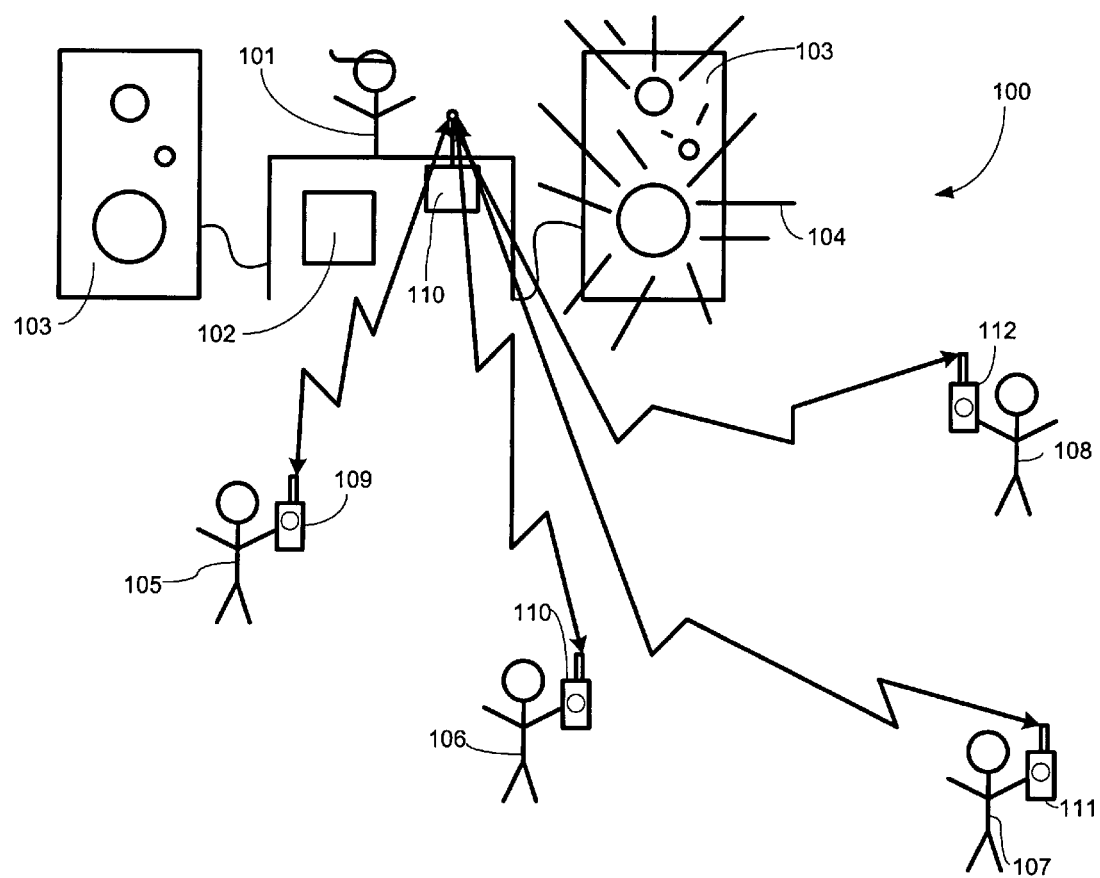
FIG. 1. illustrates a system for determining musical preferences in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides a system and method for a local music provider, such as a maestro, band, singer or DJ, to determine the popular musical preferences of the members or constituents of a group. As many electronic devices, like cellular telephones for example, include music players like MP3 players, these electronic devices also include play lists that list information about the music stored within the device. With this invention, to determine the musical preferences of the group members, the music provider first queries or interrogates the devices belonging to patrons of the group or gathering. The interrogation may be performed by local area, wireless, electronic communication protocols. As the users of the devices may selectively allow third party access to information stored within the devices, the music provider then uploads the available play lists of preferred music group members' electronic devices.

Once these lists of songs have been uploaded, the music provider then compiles the information stored within these lists into a compilation. The information associated with the songs or music of the lists may include information about musical preferences like song titles, albums, artists, genres, record labels, release dates, tempos, orchestral compositions, lyrics, composers and themes.

Once the compilation is generated, the music provider then may select a recurring musical preference from the compilation. One example of a recurring musical preference may be a song title that appears on a majority of the members' play lists. The music provider then broadcasts a song having a characteristic common with the recurring musical preference; For example, if the song title appearing on the majority of the members' playlists is "Take Five" by Dave Brubeck, the music provider might play that song, knowing full well that a majority of group members will greatly appreciate the swinging rhythms of west coast jazz.

Turning now to FIG. 1, illustrated therein is one embodiment of a system in accordance with the invention. A group of patrons 105-108 is congregating at a gathering. Each of the patrons 105-108 has a portable electronic device 109-112 having a music player, such as an MPEG (like MPEG3, a.k.a. "MP3" or MPEG4) player for playing digital music. The portable electronic devices 109-112 could be any of a number of devices, including cellular telephones, MPEG players, pagers, radios, personal computers, and personal data assistants. One such example of a cellular telephone is the Razr V3 manufactured by Motorola, Inc., which includes a MPEG4 player for playing music and video.

Since the electronic devices 109-112 include digital music stored within, each device includes a corresponding "play list" that included information and details about each song or piece of music stored within the device. The information may include song specific information, like song title, album, artist, release date, lyrics record label, or composer. The information may also include preference information associated with the music, including musical genre, tempo, orchestral composition (i.e. the types of instruments, band members, etc.), and theme.

A music provider 101 has musical equipment 102 for providing music to the members 105-108. The musical equipment 102 may include record players, CD players, tape decks, computers' radios, and the like. The musical equipment 102 is coupled to loudspeakers 103 that broadcast the audible music 104 to the members 105-108 of the group.

The music provider 101 also has a local area, wireless, electronic communications system 110. Using this communications system 110, the music provider may communicate with, query and interrogate the electronic devices 109-112. Suitable systems include wireless communication systems like Bluetooth™ enabled or ZigBee™ enabled local area networks, or other equivalent networks and protocols. For example, the Razr V3 phone mentioned above is equipped with Bluetooth™ communication circuitry.

In its most basic form, the method of this invention includes the following steps: The music provider 101 uploads a plurality of play lists from the plurality of electronic devices 109-112 belonging to the members 105-108 of the group. The music provider 101 then selects music that appears in a popular selection of play lists. For example, the music may be a song that appears on a majority or largest plurality of the play lists. If there are 100 members in the group, and 65 have "Blister in the Sun" by the Violent Femmes in their play lists, this would constitute a popular selection, in it appears on a majority of the playlists. In any event, the music provider 101 selects music present on at least two play lists from the plurality of playlists.

Once this selection, which corresponds to the musical preferences of a significant portion of the group, has been made, the music provider 101 them audibly broadcasts music consistent with this preference over the loudspeakers 103. Music that is consistent with the musical preferences of the group may include a song that appears on many play lists, however it needn't necessarily be so. It may be a song by an artist that appears on several play lists, or it may be a genre consistent with one appearing on several play lists. When the music provider 101 plays such music, they will be confident in the fact that they are playing music congruent with the tastes and preferences of multiple members in the group.

Figure 2:
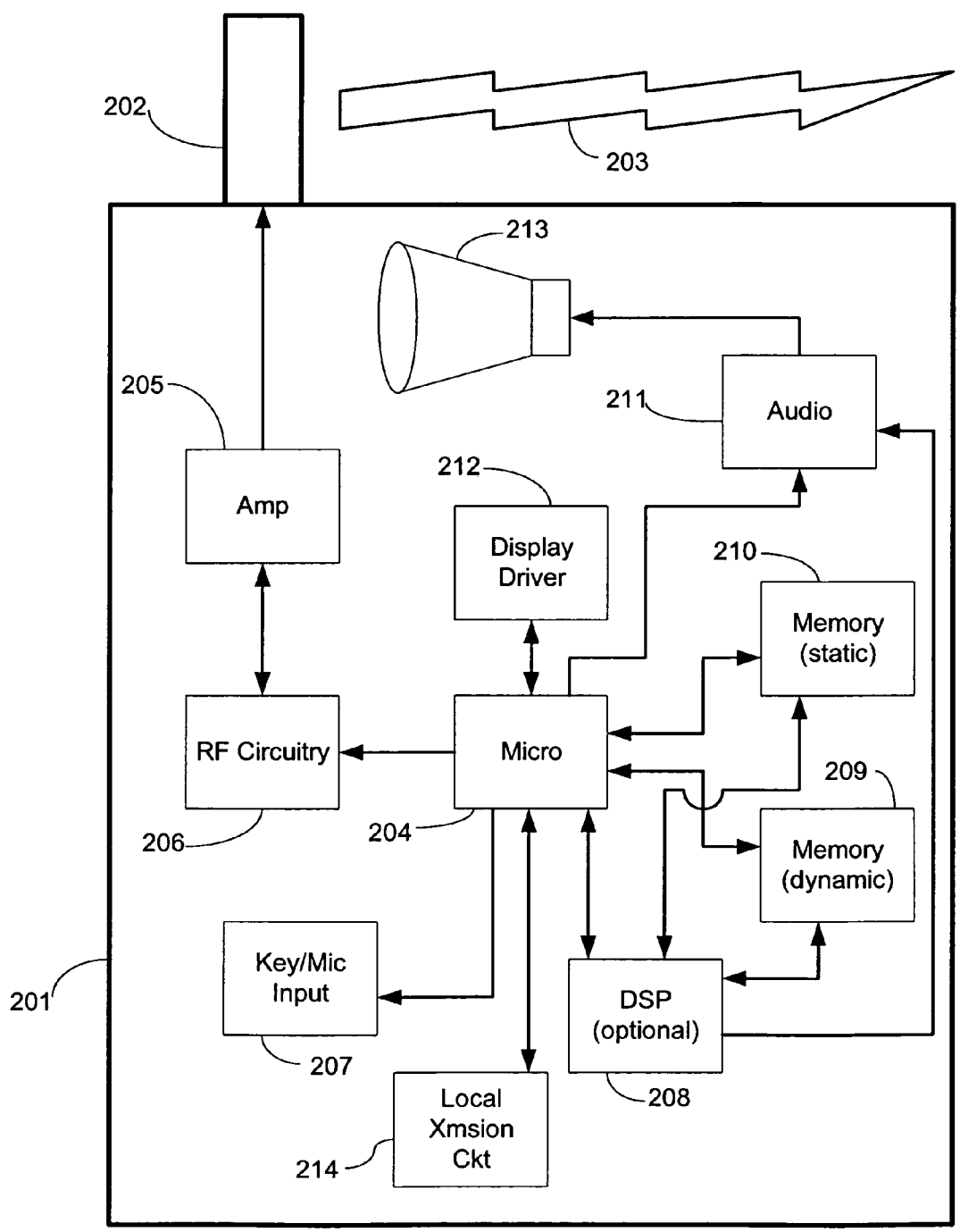
FIG. 2 illustrates an electronic device suitable for use in accordance with the invention.

Turning now to FIG. 2, illustrated therein is one example of a portable electronic device suitable for use with the invention. This exemplary hardware 200 support play list communication function referred to above. This particular example is a cellular telephone, although it will be clear to those of ordinary skill in the art having the benefit of this disclosure that other devices may be used as well.

The phone 201 includes traditional circuitry, like a central microprocessor 204 for running embedded programs, a display driver 212 for projecting information on a display or indicator, and both static 210 and dynamic 209 memory for storing parameters, user information, calls and responses, ID codes, and the like. The memory is also used for storing digital video or music, as well as the associated playlists. The digital music or video may be presented to the user with either a separate media player module, or by integrating that functionality into the central microprocessor 204.

The phone 201 may include an optional digital signal processor (DSP) for voice recognition, sound generation and multimedia applications. There is a speaker 213 and microphone 207, along with corresponding audio processing and amplification circuitry 211, as well as RF circuitry 206 and RF amplification 205 for transmitting RF signals 203 from the antenna 202 to remote devices. Local communication circuitry 214, like Bluetooth™, Zigbee™ or other types of devices is also included. Music and the associated play lists are downloaded and stored in the memory 209,210.

Figure 3:
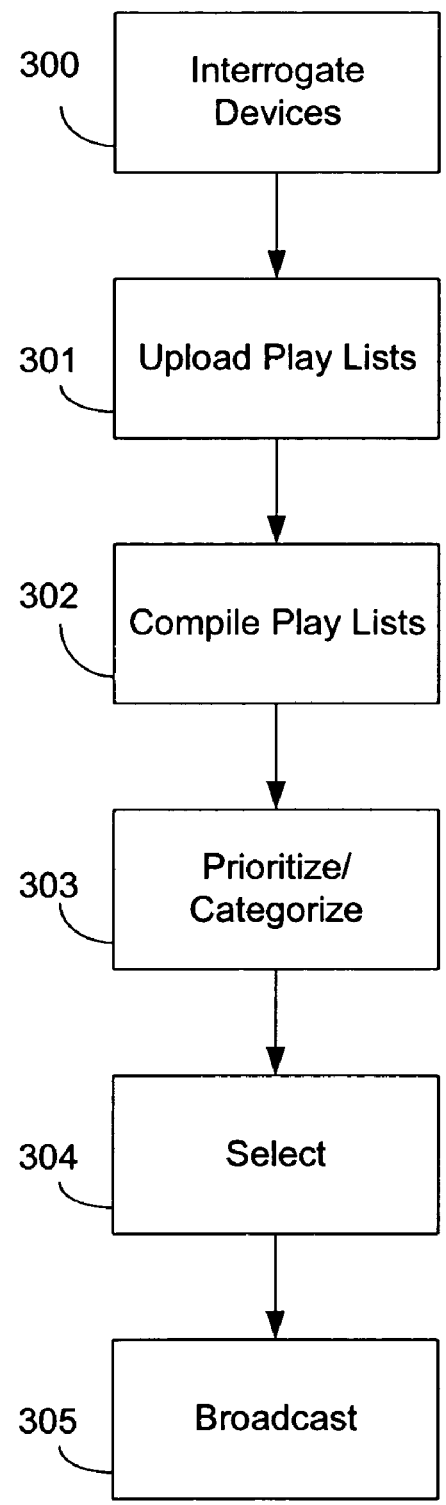
FIG. 3 illustrates one preferred method for determining musical preferences in accordance with the invention.

Turning now to FIG. 3, illustrated therein is one preferred method of determining musical preferences or tastes of the members of a group in accordance with the invention. At step 300, the communications system interrogates the plurality of electronic devices with the local area, electronic communication protocol. In this step the communications system performs a hand shake with each of the electronic devices, and determines whether the users have made available information such as play lists.

Presuming that at least some of the members have made the play lists available, at step 301 the system then uploads a plurality of song play lists from the electronic devices belonging to the members of the group. The system then compiles a list of songs from the plurality of song-play lists at step 302. The compilation includes all of the information uploaded from the devices.

At step 303, the system categorizes and prioritizes the compilation. The categorization and prioritization may include sorting songs from most popular to least popular, selecting common song elements, determining the number of occurrences, grouping by song element, or otherwise sorting the compilation. One preferred categorization includes categorizing the list based upon a song element associated with each song on the list of songs, wherein the song element is selected from the group consisting of song title, album, artist, genre, record label, release date, tempo, orchestral composition, lyrics, composer and theme. For example, if the system detects that all users include songs from the industrial pop genre, the system may sort the compilation accordingly.

At step 304, the system selects a song element. This may be the title, artist or other song elements listed above. The song element is preferably selected so as to satisfy as many members of the group as possible. In other words, selection of the song element depends upon selecting a song element occurring multiple times within the compilation or song list.

Once the song element is selected, the music provider or system, through automation, plays an audible song having characteristics with the selected song element. For example, if the song element is composer, and multiple members have songs by Henry Mancini in their play lists, the music provider may elect to put the "Hits of Mancini" CD on so as to entertain the audience.

To summarize the operation of the invention, consider the following example: Many people carry devices, like cellular telephones, that include musical play lists stored therein. When they go to an event or gathering (a local area such as a club/bar, base ball stadium, shopping mall) the system of the present invention allows a music provider to read basic information about the music stored on the mobile device. This information is then used to customize the music played publicly at that location. The information gathered can include specific names of songs, names of artist, genres, etc. Customization can include playing a specific song that most people seem to have on their mobile device, or a song from a particular artist common to many mobile devices. The reading of music could be a periodic process to ensure that the customized musical preferences accurately represent the members of the group who are present at any given time. Alternatively, the reading of music could occur when the member arrives, with a subsequent removal of those musical preferences when the member leaves.

For example, when one enters a shopping mall, the user's mobile phone may be interrogated to determine musical preferences. One user's musical preferences can then be compared with other profiles of shoppers in the shopping mall at that time. If a particular song or genre appears on a significant percentage of devices, it indicates that the shoppers present probably enjoy that song or genre. The mall then plays this song or genre, which makes the shoppers happy. Happy shoppers stay longer and spend more money. Additionally, artist and genre preferences can be used to publicize new songs that are available by the same artist or genre.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, music is used as an exemplary media that is stored in the electronic device. It will be clear to those of ordinary skill in the art having the benefit of this disclosure that the invention could equally apply to video media as well.

What is claimed is:

1. A method of determining the preferences of members of a group, the method comprising the steps of:

uploading a plurality of play lists from a plurality of electronic devices belonging to the members of the group;

prioritizing a music selection from the plurality of play lists based upon a number of occurrences of the music selection in the plurality of play lists;

selecting either the music selection or a video selection present on at least two play lists from the plurality of play lists; and audibly broadcasting the music selection from at least one loudspeaker to the members of the group.

2. The method of claim 1, wherein prioritizing the music selections from the plurality of play lists further includes categorizing the music selection from the plurality of play list from most occurring music to least occurring music.

3. The method of claim 1, wherein the music selection present on the at least two play lists from the plurality of play lists consists of the most occurring music selection.

4. The method of claim 1, wherein the step of uploading is accomplished by a local area wireless, electronic communication.

5. The method of claim 1, wherein the electronic devices are selected from the group consisting of cellular telephones, MPEG players, pagers, radios, personal computers, and personal data assistants.

6. A method of determining the musical tastes of members of a group, the method comprising the steps of:

uploading a plurality of song play lists from a plurality of electronic devices belonging to the members of the group;

compiling a list of songs from the plurality of song play lists;

categorizing the list based upon a song element associated with each song on the list of songs, wherein the song element is selected from the group consisting of song title, album, artist, genre, record label, release date, tempo, orchestral composition, lyrics, composer and theme;

prioritizing a song from the plurality of song play lists based upon a number of occurrences of the song in the plurality of play lists, selecting a song element; and playing from at least one loudspeaker an audible song having characteristics with the selected song element.

7. The method of claim 6, wherein the selection of the song element comprises selecting a song element occurring multiple times within the compiled list of songs.

8. The method of claim 6, wherein the selection of the song element comprises selecting a song element common to a majority of play lists from the plurality of play lists.

9. The method of claim 6, wherein the, step of uploading is accomplished by a local area, wireless, electronic communication.

10. The method of claim 9, wherein the electronic devices are selected from the group consisting of cellular telephones, MPEG players, pagers, radios, personal computers, and personal data assistants.

11. A method of determining what music to play at a gathering, the method comprising the steps of:

interrogating a plurality of electronic devices belonging to patrons of the gathering;

uploading a plurality of available lists of preferred music from the plurality of electronic devices;

compiling the plurality of available lists into a compilation;

prioritizing musical preferences from the compilation based upon a number of occurrences of the musical preference, wherein the musical preferences are selected from the group consisting of song titles, albums, artists, genres, record labels, release dates, tempos, orchestral compositions, lyrics, composers and themes;

selecting a recurring musical preference from the compilation; and broadcasting a music having a characteristic common with the recurring musical preference.

* * * * *